United States Patent [19]

Wise

[11] Patent Number: 5,145,290
[45] Date of Patent: Sep. 8, 1992

[54] PIPE-LAYING APPARATUS

[75] Inventor: Eugene E. Wise, Bellville, Ohio

[73] Assignee: Kokosing Construction Company Inc., Fredericktown, Ohio

[21] Appl. No.: 544,640

[22] Filed: Jun. 27, 1990

[51] Int. Cl.$^5$ .............................................. F16L 1/02
[52] U.S. Cl. ..................... 405/179; 405/157; 405/174; 405/175; 404/101
[58] Field of Search ............ 405/154, 157, 174, 175, 405/179, 184, 282, 283, 169; 404/84, 101; 33/286, 544, 624, DIG. 21; 37/80 R, 98, 103, DIG. 13

[56] References Cited

U.S. PATENT DOCUMENTS

| 119,759 | 10/1871 | Hale | 37/98 |
|---|---|---|---|
| 304,776 | 9/1884 | Barnes | 405/181 |
| 1,026,672 | 5/1912 | Hanson | 405/181 |
| 2,830,548 | 4/1958 | McElvany | 405/157 |
| 3,631,601 | 1/1972 | McNulty | 33/286 X |
| 4,629,363 | 12/1986 | Rose et al. | 405/157 X |
| 4,647,252 | 3/1987 | Floy | 405/154 |
| 4,714,381 | 12/1987 | Hatch | 405/154 X |
| 4,830,537 | 5/1989 | Munro et al. | 405/179 |

FOREIGN PATENT DOCUMENTS

| 130896 | 1/1949 | Australia | 405/157 |
|---|---|---|---|
| 638684 | 12/1978 | U.S.S.R. | 405/179 |

Primary Examiner—Randolph A. Reese
Assistant Examiner—John A. Ricci
Attorney, Agent, or Firm—Allen D. Gutchess, Jr.

[57] ABSTRACT

Apparatus for laying pipe in a trench includes a housing with a bottom, side walls, a leading end wall and a trailing end wall, with a tapered nose at the leading end, the nose being designed to be pulled along a trench by a backhoe. The nose is hinged to the leading end wall and can be pivoted up and down when the housing is moved along the trench. The housing includes a trough which receives and orients a pipe and a pusher which moves the pipe along the trough and into assembled relationship with an end of a previously-laid pipe. A hopper near the trailing end of the housing has a chute which deposits fill material around the pipe. The trailing end wall has an opening with a slidable door to strike off the top of the fill material. Mechanism is connected to the trough and door to simultaneously move them up and down to maintain the pipe on grade and to maintain the depth of fill material constant relative to the pipe. The pusher includes a cart with gears which engage tracks on sides of the trough, the gears being driven by a fluid-operated motor which receives high fluid pressure when the pipe engages a previously-laid pipe, in order to assemble them. A sensor system sends signals through the pipe to receivers in the housing and in the nose to indicate the grade and alignment of the pipe.

18 Claims, 3 Drawing Sheets

PIPE-LAYING APPARATUS

This invention relates to apparatus for laying pipe in a trench.

Apparatus has long been known for facilitating the laying of pipe in a trench. Such is shown in early patents to Barnes, U.S. Pat. No. 304,776, and to Hanson, U.S. Pat. No. 1,026,672. U.S. Pat. No. 4,714,381, issued Dec. 22, 1987, and U.S. Pat. No. 4,741,646, issued May 3, 1988, show more recent apparatus for laying pipe in trenches.

The present invention provides pipe-laying apparatus which has a number of improvements over apparatus heretofore known for accomplishing this purpose. The apparatus includes a housing of generally rectangular parallelepiped shape having a bottom, side walls, a leading end wall, and a trailing end wall. A tapered nose is located at the leading end of the housing and is designed to be pulled along a trench by an excavating machine, specifically a backhoe. The trench in front of the housing has been previously excavated by the backhoe or an additional one prior to the housing being moved therealong. The housing includes a trough which receives and orients a pipe supplied to the interior through the top of the housing. A pusher moves the pipe along the trough toward the trailing end of the housing and into assembled relationship with a bell end of a previously-laid pipe. A hopper near the trailing end of the housing deposits fill material through a chute around the previously-laid pipe. The trailing end wall has a lower opening and a door which partially obstructs an upper portion of the opening to level or strike off the fill material around the pipe. Mechanism is connected to the trough and to the door to simultaneously move them up and down. The trough is raised or lowered to maintain the pipe on a predetermined grade and the door is moved up and down to maintain the depth of the fill material around the pipe constant with regard to the position of the pipe.

The pusher which moves the pipe along the trough includes a cart having a pair of wheels in the form of gears which straddle the trough and engage tracks in the form of teeth located along each edge of the trough. The gears are driven by a fluid-operated motor. Fluid is supplied to the motor at a lower pressure and higher volume as the pipe is moved along the trough until an end of the pipe approaches an end of a previously-laid pipe. Fluid is then supplied under a higher pressure to force the pipe into tightly-assembled relationship with a bell at the end of the previously-laid pipe.

A laser-sensing system is employed with the housing to maintain the grade and transverse alignment of the pipe. A signal transmitter is positioned in a manhole or the like from which the pipe is laid in a excavated trench extending therefrom. The transmitter sends a signal longitudinally through the pipe including the pipe newly-laid by the apparatus. This signal is received by a first, elongate receiver which is horizontally disposed in the nose of the apparatus. This receiver actuates a first indicator located on top of the housing which signals the backhoe operator if the housing is transversely misaligned with respect to the axis of the pipe. A second, elongate receiver is also located in the nose and is vertically disposed. The second receiver actuates a second indicator on top of the housing which signals the backhoe operator whether the leading end of the housing is vertically misaligned with respect to the axis of the pipe. The sensor system also includes a third receiver which is located near the pusher cart and receives a signal from the transmitter along the axis of the pipe. This third receiver causes the trough to be raised or lowered to maintain the proper on-grade position of the pipe being laid. More specifically, the third receiver operates mechanism at the leading end of the trough to raise or lower that end. An additional sensor near the trailing end of the trough then controls raising or lowering of the trailing end the same amount as the leading end to maintain the same angular position of the trough.

If the position of the newly-laid pipe is higher, for example, the fill material ordinarily would not be as deep above the pipe or the pipe may even extend above it. To overcome this, bell-crank mechanism which raises and lowers the trailing end of the trough also simultaneously raises and lowers the door at the opening in the trailing end wall of the housing. This accordingly increases or decreases the depth and specifically the upper level of the fill material so that its relationship relative to the pipe remains the same even though the pipe is in a higher or lower position relative to the housing. A second door can be mounted on the first one and further raised to completely clear the opening in the trailing end wall to enable a Y-connection to be placed in the pipe line, for example.

The nose positioned in front of the leading wall of the housing includes a generally horizontal bottom wall, generally triangularly-shaped side walls, and a slanted upper wall. The nose has an edge at the juncture of the bottom wall and the top slanted wall which aids in shaping the bottom of the trench excavated by the backhoe. The nose is hinged to the leading end of the housing and specifically to lower end portions of the leading end wall thereof. The nose can be pivoted up and down to aid in controlling the depth of the trench.

It is, therefore, a principal object of the invention to provide pipe-laying apparatus having the features and advantages discussed above.

Many other objects and advantages of the invention will be apparent from the following detailed description of a preferred embodiment thereof, reference being made to the accompanying drawings, in which.

Figure 1:
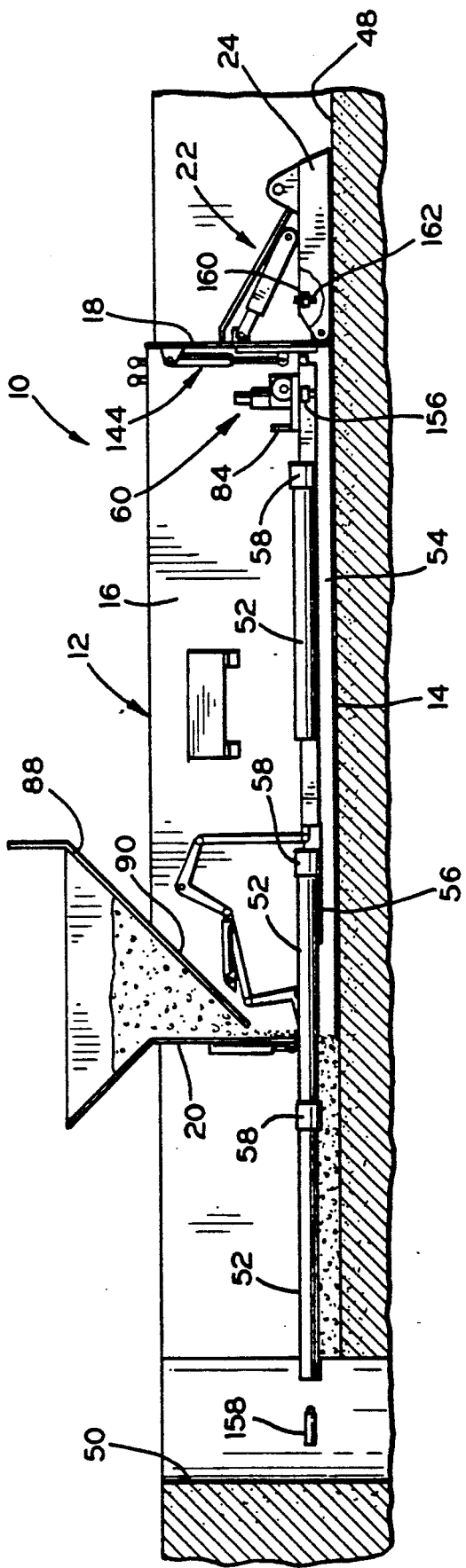
FIG. 1 is a schematic view in longitudinal, vertical cross section of pipe-laying apparatus, including a sensing system, embodying the invention.

Referring to the drawings, and more particularly to FIG. 1, pipe-laying apparatus according to the invention is indicated at 10 and includes a housing 12 of generally rectangular parallelepiped shape having a bottom wall 14, side walls 16, a leading end wall 18, and a trailing end wall 20 forming a substantially water-tight compartment. By way of example, the housing 12 can have a length of twenty-four feet, a height of six feet, a forward width of thirty-four inches, and a rear width of thirty-two inches. The variance in width minimizes the chance that the housing can become wedged in the trench along which it is moved. One or more extension housings can be placed on the housing 12 for deeper trenches, as is known in the art. These typically are of the same horizontal, cross-sectional shape and size as the housing 12 and have a height of four feet. They can be relatively quickly attached to the top edge of the housing 12 by pins and wedge locks.

Figure 2:
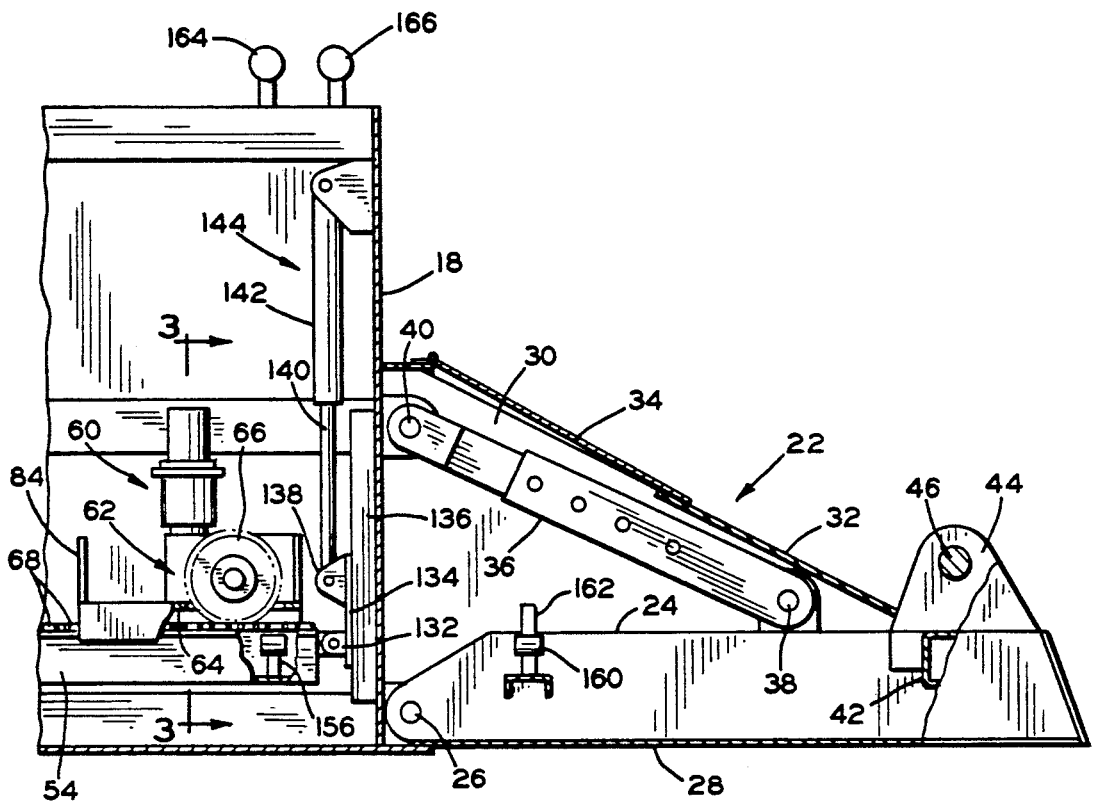
FIG. 2 is a schematic, enlarged view in longitudinal, vertical cross section of a forward portion of the pipe-laying apparatus of FIG. 1.

A nose 22 is located at the leading end of the housing 12 and has side bars 24 which are pivotally attached to the leading end wall 18 by pivot pins 26 (FIG. 2). The nose 22 includes a bottom wall 28, triangularly-shaped side walls 30, a slanted top wall 32, and an access lid 34. Heavy duty braces 36, which are adjustable, are pivotally attached to the bars 24 by pins 38 and further attached to the leading end wall 18 by pins 40. A heavy cross beam 42 extends across the leading end of the nose 22 and has brackets 44 extending upwardly therefrom and carrying a thick bar 46 which is engaged by a claw of the backhoe to move the apparatus 10 along a trench 48 (FIG. 1). The trench 48 in front of the housing 12 has been previously excavated by the backhoe or a second backhoe prior to the housing being moved therealong. The trench 48 typically extends from a manhole 50. The nose 22 can be pivotally adjusted about the pins 26 to aid in controlling the depth and shape of the bottom of the trench 48.

Figure 6:
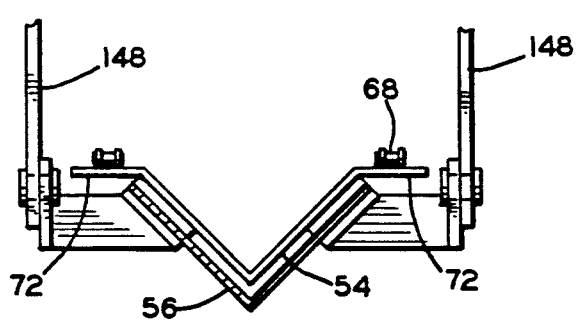
FIG. 6 is a somewhat schematic view in transverse cross section taken along the line 6—6 of FIG. 4.

Pipes 52 are supplied through the open top of the housing 12 and positioned longitudinally of the trench 48 on a V-shaped trough or tray 54. The trough extends through a substantial portion of the housing 12 and has a rear offset portion 56 (FIGS. 1, 4, and 6) to accommodate a bell 58 of the pipe 52. This enables adjacent pipes to be in axial alignment when an end of a newly-positioned pipe is assembled with the bell of a previously-laid one.

Figure 3:
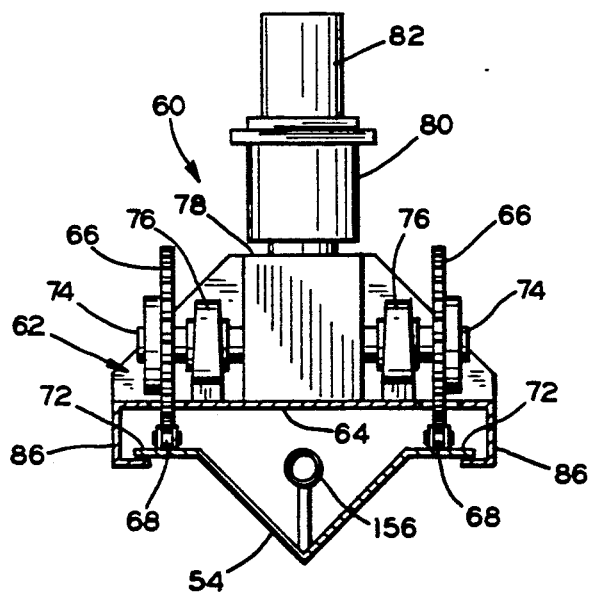
FIG. 3 is a further enlarged view in transverse cross section taken along the line 3—3 of FIG. 2.
Figure 4:
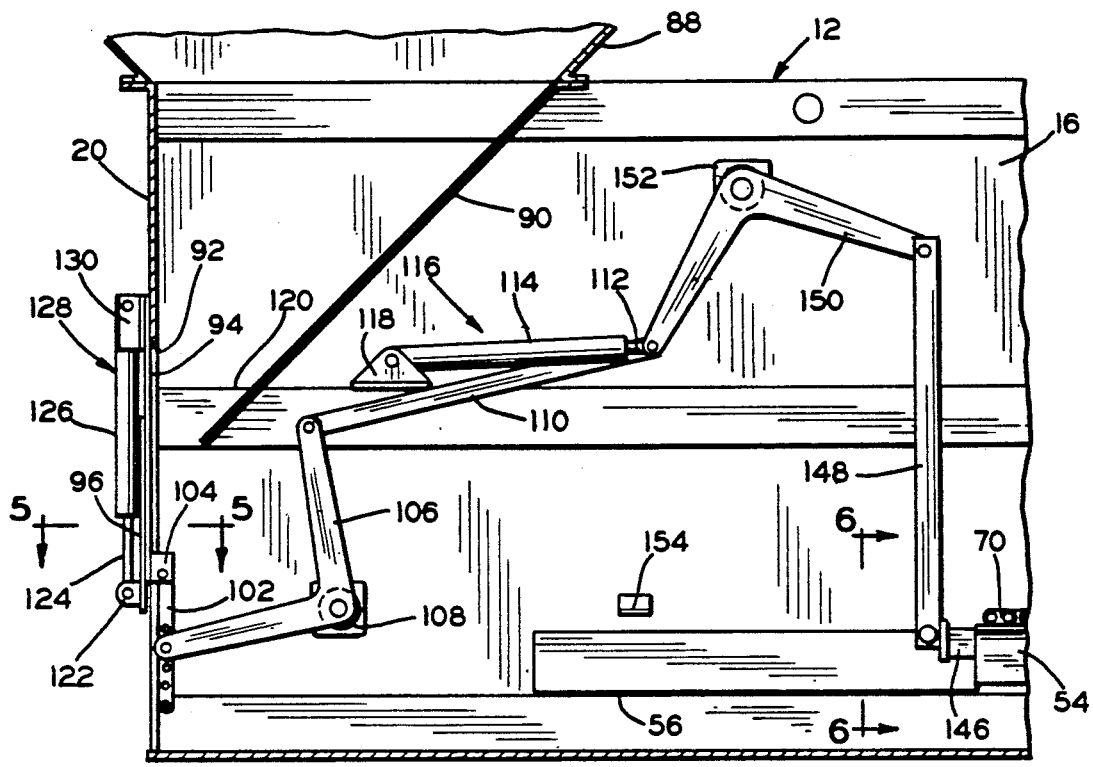
FIG. 4 is a somewhat schematic, enlarged view in longitudinal, vertical cross section of a rear portion of the pipelaying apparatus of FIG. 1.

The pipe 52 is moved along the trough 54 toward a previously laid one by a pusher 60 (FIGS. 2 and 3). The pusher 60 includes a cart 62 having a platform 64 and wheels in the form of gears 66. The gears 66 engage teeth 68 which preferably are cross pins of roller chains 70 (FIG. 4). The chains 70 are affixed to side flanges 72 which extend outwardly from the V-shaped trough 54 and also extend longitudinally thereof. The teeth could also be formed by other suitable means.

The gears 66 are mounted on jackshafts 74 which are rotatably supported by bearing blocks 76 on the platform 64. The shafts 74 are turned by a fluid-driven motor 78 which is supplied with fluid under pressure by a hydraulic pump 80. A pressure-sensitive switch control 82 controls the fluid supplied by the pump 80 to the motor 78. Fluid is first supplied to the motor under higher volume and lower pressure to push the pipe 52 along the trough by a pusher flange 84 (FIG. 2) at a relatively high speed until the forward end of the pipe 52 approaches or engages the bell 58 of the previously-laid pipe. The fluid is then caused by the control 82 to be supplied at higher pressure and lower volume to the motor 78 to force the pipe 52 into assembled relationship with the bell 58 of the previously-laid pipe 52. As best shown in FIG. 3, the side edges of the platform 64 have downwardly-extending L-shaped flanges 86. These extend under the trough side flanges 72 to hold the gears 66 in engagement with the teeth 68 as the pusher 60 moves a pipe along the trough 54.

Figure 5:
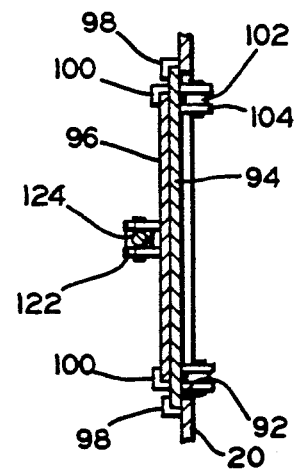
FIG. 5 is a somewhat schematic view in transverse cross section taken along the line 5—5 of FIG. 4.

A hopper 88 located above the trailing end of the housing 12 is filled with fill material, such as suitable gravel, which is supplied through a chute 90 around the previously-laid pipe. The chute 88 is detachably connected so that it can be removed and placed on top of a housing extension or extensions when used with deeper trenches. The trailing end wall 20 has a lower opening 92 (FIGS. 4 and 5) which is partially closed off by an inner door 94 and an outer door 96. The inner door 94 is guided by side guides 98 which are affixed to the trailing end wall 20 and the outer door 96 is guided by rails 100 which are affixed to the inner wall 94.

In normal operation, the lower edge of the outer door 96 extends below the lower edge of the inner door 94 and strikes off the fill material so that the upper surface thereof is at a predetermined level relative to the newly-laid pipes 52. If the newly-laid pipes are raised or lowered to maintain a predetermined grade, the doors 94 and 96 are raised or lowered to maintain the depth of the fill material around the pipe constant relative to the position of the pipe.

Figure 7:
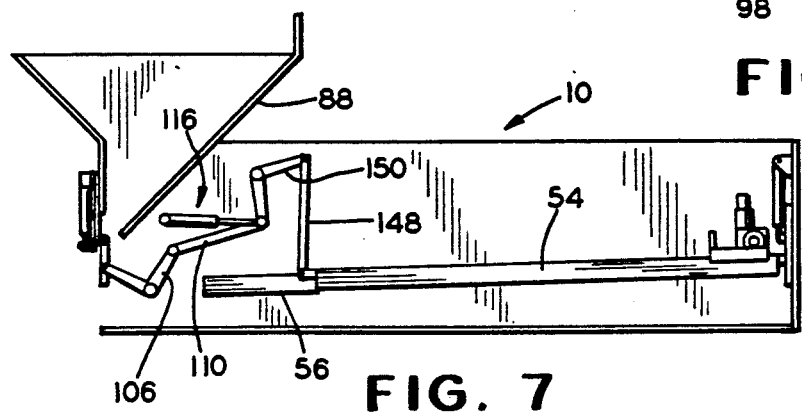
FIG. 7 is a schematic view of the apparatus of FIG. 1 with certain components shown in different positions.

To move the inner door 94 up or down, adjustable links 102 are pivotally connected to ears 104 which are affixed to the inner surface of the inner door 94 near the side edges thereof. The links 102 are pivotally connected to bell-crank levers 106 which are pivotally supported by pivot blocks 108 affixed to the side walls 16. The upper end of each of the bell-crank levers 106 is pivotally connected to a drive link 110, the other end of which is pivotally connected to a piston rod 112 extending from a cylinder 114 of a fluid-operated ram 116. The blind end of the cylinder 114 is pivotally supported by a bracket 118 mounted on a side beam 120 of the housing 12. When the piston rod 112 is extended, the bell-crank lever 106 is moved in a clockwise direction to raise the inner door 94, as shown in FIG. 7. The fill material is then levelled or struck off at a higher level by the lower edge of the outer door 96.

The outer door 96 moves up and down with the inner door 94 during normal operation. The outer door has ears 122 which are connected to a piston rod 124 extending from a cylinder 126 of a fluid-operated ram 128. The blind end of the cylinder 126 is connected to brackets 130 which are affixed to an upper portion of the inner door 94 so that the outer door and the ram 128 move together with the inner door 94. When a Y-connection is to be placed in the pipe line, for example, the piston rod 124 is retracted to raise the outer door 96 relative to the inner door and increase the effective height of the opening 92 in the trailing end wall 20. After the Y-connection is passed, the piston rod 124 is extended again to move the outer door 96 to its previous position relative to the inner door 94.

At times, it is desirable to raise or lower the trough 54 and its extension 56 to maintain the newly-laid pipes on grade. To raise or lower the leading end of the trough 54, it is connected by ears 132 (FIG. 2) to a plate 134 which is backed up by guides 136 located at the leading end wall 18. The plate 134 has ears 138 which are pivotally connected to piston rod 140 extending from a cylinder 142 of a fluid-operated ram 144. When the piston rod 140 is retracted or extended, the forward end of the trough 54 is raised or lowered.

When the leading end of the trough 54 is raised or lowered, the trailing end of the trough 54 and the extension 56 is also raised or lowered to maintain the grade angle. For this purpose, the trailing end of the trough 54 has brackets 146 (FIG. 4) which are pivotally connected to upright links 148 which, in turn, are pivotally connected to ends of bell-crank levers 150. The bell-crank levers 150 are pivotally supported by pivot blocks 152 which are affixed to the side walls 16 of the housing 12. The other end of each of the bell-crank levers 150 is also connected to the piston rod 112 of the fluid-operated ram 116. When the piston rod 112 is extended, the bell-crank lever 150 moves counter-clockwise, causing the link 148 to raise the trailing end of the trough 54, as shown in FIG. 7. The doors 94 and 96 thus move up and down with the trailing end of the trough 54 to maintain the constant relationship of the fill material and the newly-laid pipes.

To maintain a constant grade for the pipes 52, the leading and trailing ends of the trough 54 are moved the same amount. When the fluid-operated ram 144 raises or lowers the leading end of the trough 54, a sensor 154 at the trailing end of the trough 54 senses the position of the trough and causes the trailing end thereof to be raised or lowered the same amount as the leading end by causing the fluid-operated rams 116 to extend or retract the piston rods 112.

A sensor receiver 156 (FIG. 1) mounted in a leading end portion of the trough 54 controls operation of the fluid-operated ram 144 to raise and lower the leading end of the trough 54. The receiver 156 receives a laser signal from a laser emitter or transmitter 158 which is located in the manhole 50 and transmits the signal through the pipes 52 to the sensor receiver 156.

Referring to FIG. 2, horizontal and vertical sensor receivers 160 and 162 are located in the nose 22 and also receive laser signals from the transmitter 158. The leading end wall 118 has an opening through which the laser signals are transmitted. The laser transmitter 158, which is commercially available, transmits the laser signals by means of a prism which enables the signals to be picked up by the sensor receiver 156 as well as the receivers 160 and 162. The horizontal receiver 160 is connected to an indicator 164 located at the upper forward end of the housing 12 which provides a visual indication to the backhoe operator about the tranverse position of the housing 12. The backhoe operator can accordingly manipulate the claw and, through the bar 46, move the housing accordingly. Similarly, the vertical sensor receiver 162 is connected to a vertical indicator 166 mounted on the upper leading end portion of the housing 12. This gives a visual indication to the backhoe operator about the vertical position of the housing 12 so that he can control that position through the backhoe claw and the rod 46.

The various components of the sensing system including the transmitter 158, the sensor receivers 156, 160, and 162, and the sensor 154, along with the indicators 164 and 166, are all commercially-available components and need no further discussion.

Various modifications of the above-described embodiment of the invention will be apparent to those skilled in the art, and it is to be understood that such modifications can be made without departing from the scope of the invention, if they are within the spirit and the tenor of the accompanying claims.

I claim:

1. Apparatus for laying pipe in a trench, said apparatus comprising an elongate housing of generally retangular parallelepiped shape having a bottom, side walls, a leading end wall, and a trailing end wall, said housing having trough means extending longitudinally therein for receiving and positioning pipe, a tapered nose in front of said leading end wall and being pivotally connected to said leading end wall at a lower edge portion thereof, track means on each side of said trough means and extending parallel thereto, a cart having wheel means in the form of gears engageable with said track means for moving said cart along said track means when said gears are driven, drive means on said cart for driving said gears, fluid supply means for supplying fluid under pressure to said drive means when a pipe is moved along said trough by said cart and for supplying fluid under higher pressure when the pipe engages an end of a previously-laid pipe, said trailing end wall having a lower opening therein, first door means slidably mounted relative to said trailing end wall and having a lower position at least partially closing off said opening and an upper position uncovering a substantial portion of said opening, means carried by said housing for simultaneously raising said trough means and moving said door means toward the upper position and for simultaneously lowering said trough means and moving said door means toward the lower position, a sensor transmitter for sending a signal through a plurality of newly-laid pipes, a first sensor receiver located in said nose for detecting the transverse position of said apparatus relative to the trench, a second sensor receiver in said nose for detecting the vertical position of said apparatus in the trench, and a third sensor receiver carried by said trough means for controlling the vertical position of a leading end portion of said trough means.

2. Apparatus according to claim 1 wherein second door means is mounted for vertical movement relative to said first door means, said second door means having a lower position with a lower edge extending below a lower edge of said first door means and having an upper position with the lower edge above the lower edge of said first door means.

3. Apparatus according to claim 1 wherein a first indicator is mounted on said housing and connected to said first sensor receiver to provide a visual indication of the transverse position of said apparatus, and a second indicator is mounted on said housing and connected to said second sensor receiver to provide a visual indication of the vertical position of said apparatus.

4. Apparatus according to claim 1 wherein said means for raising and lowering said trough means comprises a fluid-operated ram connected to a leading end portion of said trough means.

5. Apparatus according to claim 4 wherein said third sensor receiver controls the supply of fluid to said fluid-operated ram.

6. Apparatus according to claim 5 wherein a second fluid-operated ram is connected to a trailing end portion of said trough means, and a sensor for sensing the position of a trailing end portion of said trough means controls the supply of fluid to said second fluid-operated ram.

7. Apparatus according to claim 6 wherein linkage means connects said second fluid-operated ram with said door means for moving said door means toward the upper position and the lower position.

8. Apparatus according to claim 1 wherein adjustable links connect said adjustable nose with said leading end wall.

9. Apparatus for laying pipe in a trench, said apparatus comprising an elongate housing of generally rectangular parallelepiped shape having a leading end and a trailing end, an end wall of the trailing end of said housing having a lower opening therein, trough means in said housing extending generally longitudinally thereof, a door for said opening having a lower position at least partially closing said opening and an upper position uncovering at least most of said opening, and means carried by said housing and connected to said trough means and said door for simultaneously raising and lowering said trough means and for moving said door toward its upper and lower positions.

10. Apparatus according to claim 9 wherein said last-named means raises said trough means and moves said door toward its upper position simultaneously and lowers said trough means and moves said door toward its lower position simultaneously.

11. Apparatus according to claim 9 wherein a second door is mounted for vertical movement relative to said first door, said second door having a lower position with a lower edge extending below a lower edge of said first door and having an upper position with the lower edge above the lower edge of said first door.

12. Apparatus according to claim 11 wherein means are carried by said first door for moving said second door toward the upper and lower positions.

13. Apparatus for laying pipe, said apparatus comprising an elongate housing having a leading end and a trailing end, a trough in said housing extending longitudinally thereof, track means on each side of said trough and extending parallel thereto, a cart having wheel means engageable with said track means for moving said cart along said trough when said wheel means are driven, and drive means on said cart for driving said wheel means.

14. Apparatus according to claim 13 wherein said drive means is fluid-operated and receives fluid under higher pressure when a pipe moved along said trough by said cart engages an end of a previously-laid pipe.

15. Apparatus according to claim 13 wherein said track means comprises longitudinally-spaced teeth on each side of said trough, and said wheel means constitute gears engageable with said teeth.

16. Apparatus according to claim 15 wherein said track means is located on flanges extending outwardly from both sides of said trough, and said cart has flange means extending under said flanges to prevent said gears from separating from said teeth.

17. Apparatus for laying pipe in a trench, said apparatus comprising a remotely-located sensor transmitter for sending a signal through a plurality of newly-laid pipes, an elongate housing having a leading end and a trailing end, a nose on the leading end of said housing, a first sensor receiver in said nose for detecting the extent to which said nose is transversely offset horizontally from a predetermined position, a second sensor receiver in said nose for detecting the extent to which said nose is transversely offset vertically from a predetermined position, a first indicator carried by said housing and responsive to said first sensor receiver for indicating to an operator the extent to which said nose is transversely offset horizontally from a predetermined position, and a second indicator carried by said housing and responsive to said second sensor receiver for indicating to the operator the extent to which said nose is transversely offset vertically from the predetermined position.

18. Apparatus according to claim 17 wherein a third sensor receiver is located in said housing to detect if the last newlylaid pipe is on grade with the previously-laid pipes.

* * * * *